United States Patent
Clark et al.

(10) Patent No.: US 9,986,803 B2
(45) Date of Patent: Jun. 5, 2018

(54) APPARATUS FOR HOLDING AN ELECTRONIC DEVICE HAVING A MECHANICAL SELF-ADJUSTING RETENTION ELEMENT

(71) Applicant: FORD GLOBAL TECHNOLOGIES, LLC, Dearborn, MI (US)

(72) Inventors: Scott Clark, Ypsilanti, MI (US); Mark Wells, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 14/857,381

(22) Filed: Sep. 17, 2015

(65) Prior Publication Data
US 2017/0079391 A1    Mar. 23, 2017

(51) Int. Cl.
| | |
|---|---|
| A45C 11/00 | (2006.01) |
| B60R 11/02 | (2006.01) |
| H04M 1/04 | (2006.01) |
| B60R 11/00 | (2006.01) |

(52) U.S. Cl.
CPC .............. *A45C 11/00* (2013.01); *B60R 11/02* (2013.01); *H04M 1/04* (2013.01); *A45C 2011/002* (2013.01); *A45C 2011/003* (2013.01); *B60R 2011/0071* (2013.01)

(58) Field of Classification Search
CPC ... A45C 2011/002; A45C 13/02; B65D 51/26; A45F 2200/0516
USPC ....... 224/440, 242, 245, 247, 246, 679, 930; 206/320
See application file for complete search history.

(56) References Cited

U.S. PATENT DOCUMENTS

| | | | | |
|---|---|---|---|---|
| D350,545 S | * | 9/1994 | Olkkola | D14/142 |
| 5,588,055 A | * | 12/1996 | Williamson | B60R 11/0241 379/426 |
| 5,832,082 A | | 11/1998 | Nagai | |
| 5,915,572 A | * | 6/1999 | Hancock | A47B 81/005 211/64 |
| 6,301,825 B1 | * | 10/2001 | Doreian | A01K 97/06 43/25.2 |
| 6,438,229 B1 | * | 8/2002 | Overy | H02J 7/0044 379/446 |
| 6,491,194 B2 | | 12/2002 | Marvin | |
| 7,040,590 B2 | * | 5/2006 | Carnevali | B60N 3/103 248/309.1 |
| 2004/0020954 A1 | * | 2/2004 | Gates | B60R 9/048 224/442 |
| 2008/0073927 A1 | * | 3/2008 | Schoemann | B29C 45/1676 296/37.1 |

(Continued)

FOREIGN PATENT DOCUMENTS

| | | |
|---|---|---|
| EP | 0585011 A1 | 3/1994 |
| JP | 2013043626 A | 3/2013 |

OTHER PUBLICATIONS

English machine translation of JP2013043626A.

*Primary Examiner* — Justin Larson
*Assistant Examiner* — Phillip Schmidt
(74) *Attorney, Agent, or Firm* — Vichit Chea; King & Schicki, PLLC

(57) ABSTRACT

An apparatus is provided for holding an electronic device. That apparatus includes a body having a cavity for receiving the electronic device. The body also includes an integral retention element that engages the electronic device in the cavity to hold the electronic device in a desired position.

17 Claims, 8 Drawing Sheets

(56) References Cited

U.S. PATENT DOCUMENTS

2010/0213335 A1    8/2010  Peng et al.

* cited by examiner

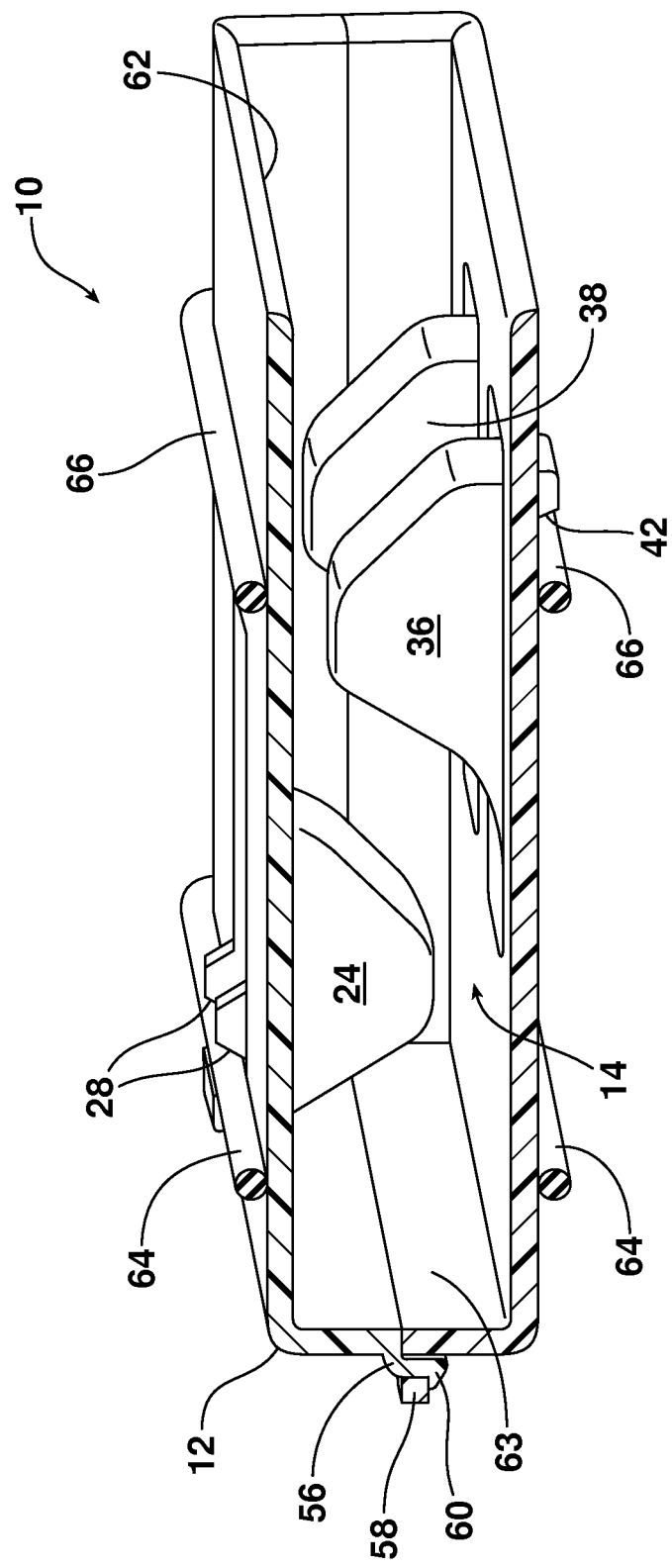

APPARATUS FOR HOLDING AN ELECTRONIC DEVICE HAVING A MECHANICAL SELF-ADJUSTING RETENTION ELEMENT

TECHNICAL FIELD

This document relates generally to the motor vehicle equipment field and, more specifically, to an apparatus for holding an electronic device that incorporates an integral, mechanical self-adjusting retention element to hold the electronic device in a desired position within the apparatus.

BACKGROUND

Smartphones and tablets are becoming increasingly popular with individuals in today's on-the-go society. Many of these individuals utilize their smartphones and tablets to employ various applications to obtain travel directions to a destination point. Thus, it is desirable to have a convenient location in an automobile to hold or stow smartphones and tablets where they may be easily accessed.

This document relates to a new and improved apparatus for holding an electronic device such as a smartphone or tablet at a convenient location within a motor vehicle. Advantageously, the apparatus is efficient in package space and meant to be integrated with the interior area of the motor vehicle for easy access and usability. Thus, the apparatus is designed to be attached to any class "A" surface panel via various fastening designs, such as clips, screws or sonic/vibration welding.

SUMMARY

In accordance with the purposes and benefits described herein, an apparatus is provided for holding an electronic device such as a smart phone or tablet. That apparatus comprises a body including a cavity for receiving the electronic device. That body further includes an integral retention element that engages the electronic device in the cavity to hold the electronic device in a desired position.

In one possible embodiment, the integral retention element has a proximal end, formed by a living hinge, and a free distal end. The body includes a first section having a first opening, and the integral retention element is provided in the first opening.

In another possible embodiment, the apparatus includes a second integral retention element having a second proximal end, formed by a second living hinge, and a second free distal end. In still another possible embodiment, the apparatus includes a third integral retention element having a third proximal end, formed by a third living hinge, and a third free distal end. Further, that body may include a second open and a third opening. The second integral retention element is received in the second opening while the third integral retention element is received in a third opening. Still further, the second opening and the third opening may be provided in a second section of the body opposite the first section so that when the electronic device is received in the cavity, it is retained by the three retention elements, with the first retention element acting in opposition to the second and third retention elements.

In accordance with yet another aspect, the apparatus may include a flexible hinge connecting the first and second sections. In addition, a first elastic band may be provided extending around the body and across a rear side of the integral retention element. That integral retention element may include a beveled face for engaging the electronic device and at least one groove receiving and holding the first elastic band at the rear side of the integral retention element opposite the beveled face.

Still further, the apparatus may include a second elastic band extending around the body and across the rear sides of the second integral retention element and the third integral retention element. Accordingly, the second integral retention element may include a second beveled face and at least one second groove receiving and holding the second elastic band. Similarly, the third integral retention element may include a third beveled face and at least one third groove receiving and holding the second elastic band.

In accordance with an additional aspect, the apparatus may also include a snap tab feature for securing the first section to the second section so as to form the cavity that receives the electronic device. That snap tab feature may comprise a plurality of resilient tabs and a plurality of cooperating latching lugs.

In accordance with yet another aspect, the body of the apparatus, including the first, second and third integral retention elements may be of unitary construction. More specifically, the apparatus may be molded from a single piece of plastic material so as to minimize the overall number of parts and reduce production costs while also ensuring reliable performance over a long service life. Such an apparatus also minimizes vibration and noise associated with the retention elements.

In accordance with yet another aspect, the apparatus for holding the electronic device comprises a body including a cavity and opposed and offset retention elements extending into said cavity and engaging the electronic device in the cavity. At least one elastic band extends around the body and across the opposed and offset retention elements to bias the retention elements against the electronic device.

In accordance with an additional embodiment, it should be appreciated the body may include separate first and second sections that are connected together to form the cavity rather than first and second sections connected by a flexible hinge as previously noted.

In the following description, there are shown and described several preferred embodiments of the apparatus. As it should be realized, the apparatus is capable of other, different embodiments and its several details are capable of modification in various, obvious aspects all without departing from the apparatus as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and together with the description serve to explain certain principles thereof. In the drawing figures:

FIG. 5a illustrates the smartphone being inserted into the cavity formed by the body while FIG. 5b illustrates the smartphone fully inserted and held in that cavity.

FIGS. 6 and 7 illustrate an alternative embodiment wherein the first and second sections of the apparatus are separate components that are connected together by fasteners in contrast to the embodiment illustrated in FIGS. 1-5b wherein the first and second sections are connected together by fasteners along the bottom edge instead of a flexible hinge.

Figure 1:
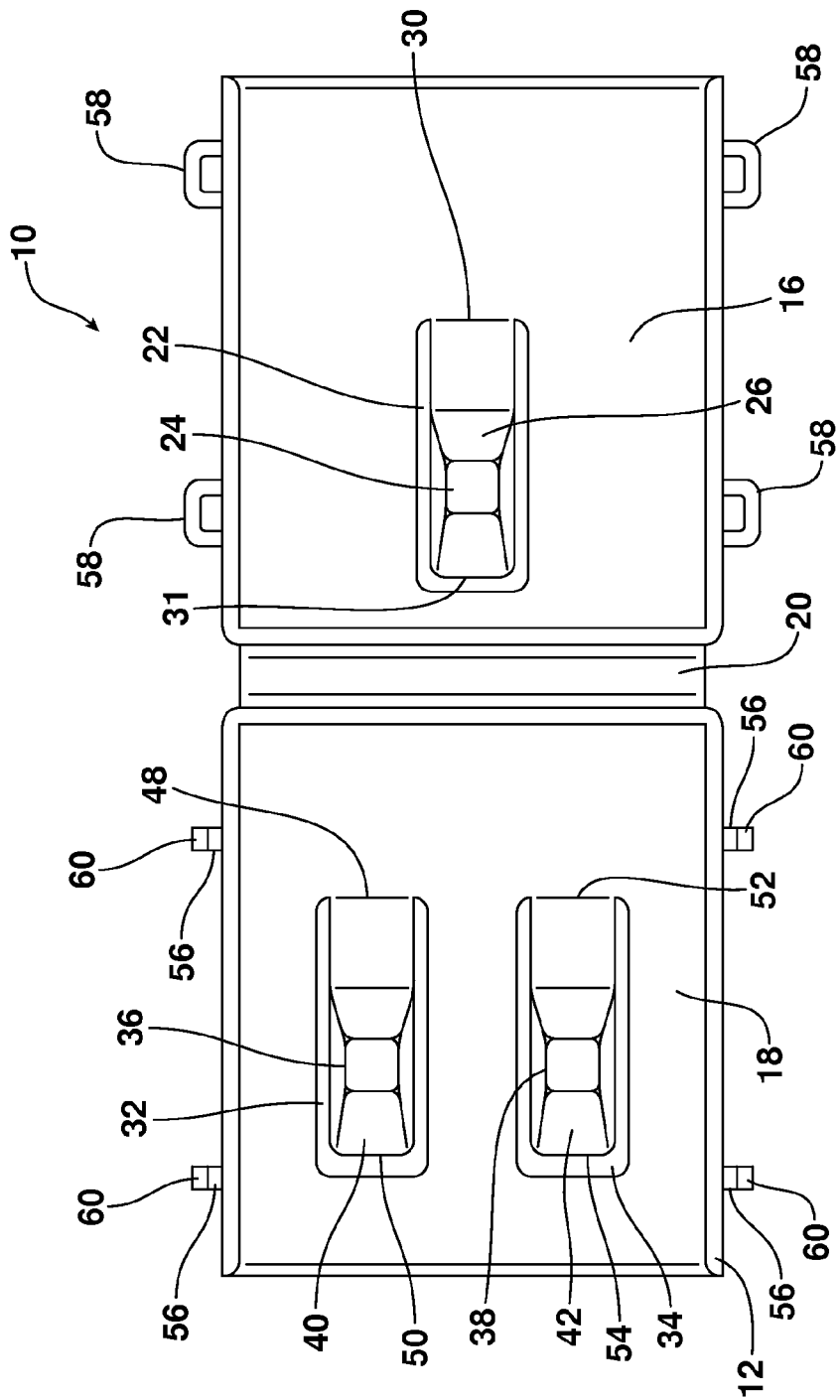
FIG. 1 is a top plan view of the as-molded apparatus illustrating a body and three integral retention elements received in openings formed in the body and supported by living hinges at a first end of each retention element.

Reference will now be made in detail to the present preferred embodiments of the apparatus, examples of which are illustrated in the accompanying drawing figures.

DETAILED DESCRIPTION

Reference is now made to FIGS. 1-5b illustrating a first embodiment of an apparatus 10 for holding an electronic device D. That apparatus 10 includes a body 12 forming a cavity 14 adapted to receive an electronic device D. More specifically, the body 12 includes a first section 16 and a second section 18 that are connected together by means of a flexible hinge 20.

Figure 2:
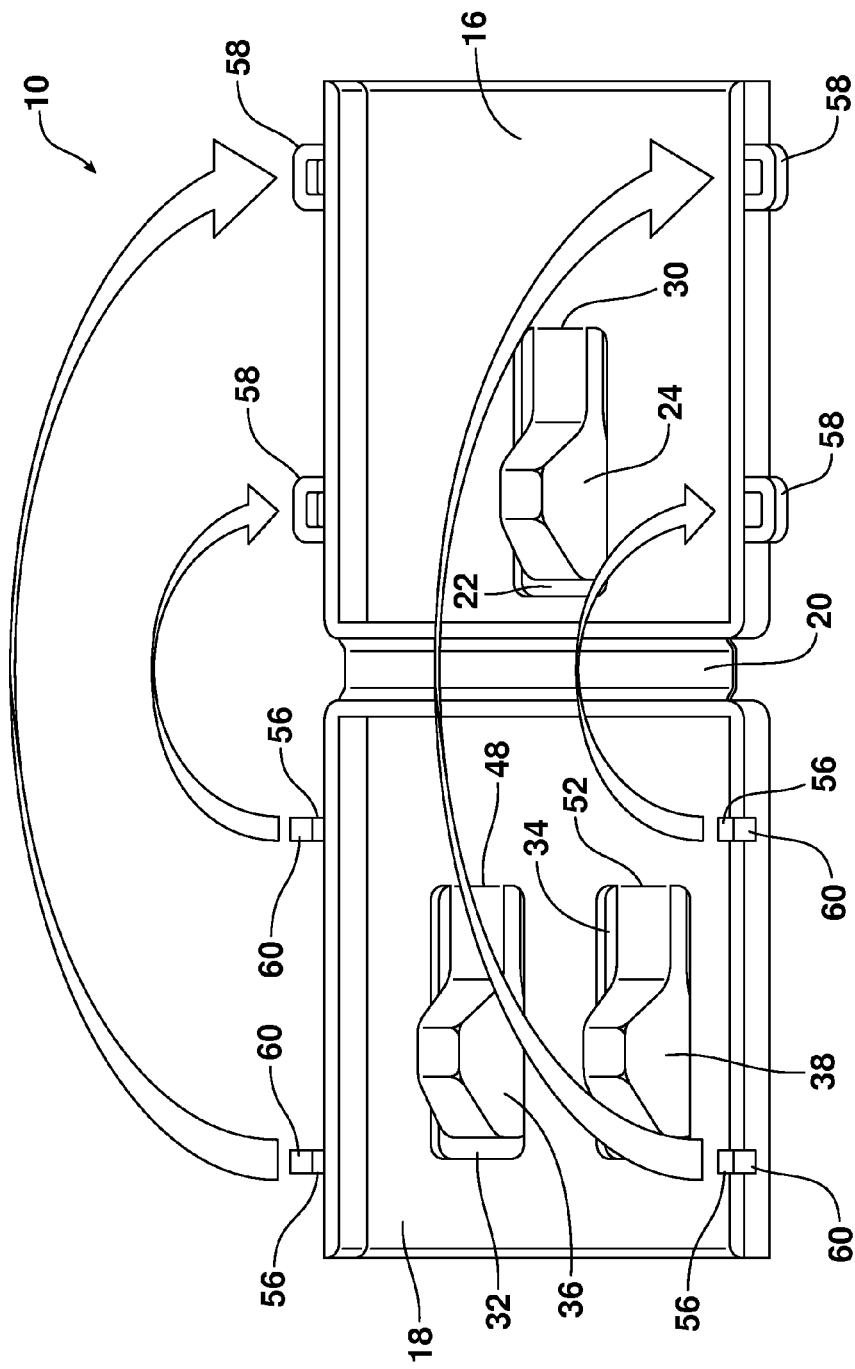
FIG. 2 is a perspective view illustrating how the two sections of the body are connected together by folding or rotating about an integral flexible hinge that connects those two sections together.

As best illustrated in FIGS. 1 and 2, the first section 16 includes a first opening 22. A first integral retention element 24 is provided in the first opening 22. As illustrated, the first retention element 24 includes a beveled front face 26 and at least one groove 28 on the rear side thereof, the function of which will be discussed below. As should be appreciated, the first integral retention element 24 has a proximal end, formed by a living hinge 30 that connects the retention element to a margin of the first opening 22 and a free, distal end 31 opposite the living hinge 30. Thus, it should be appreciated that the first integral retention element 24 pivots with respect to the first section 16 about the living hinge 30.

Figure 3:
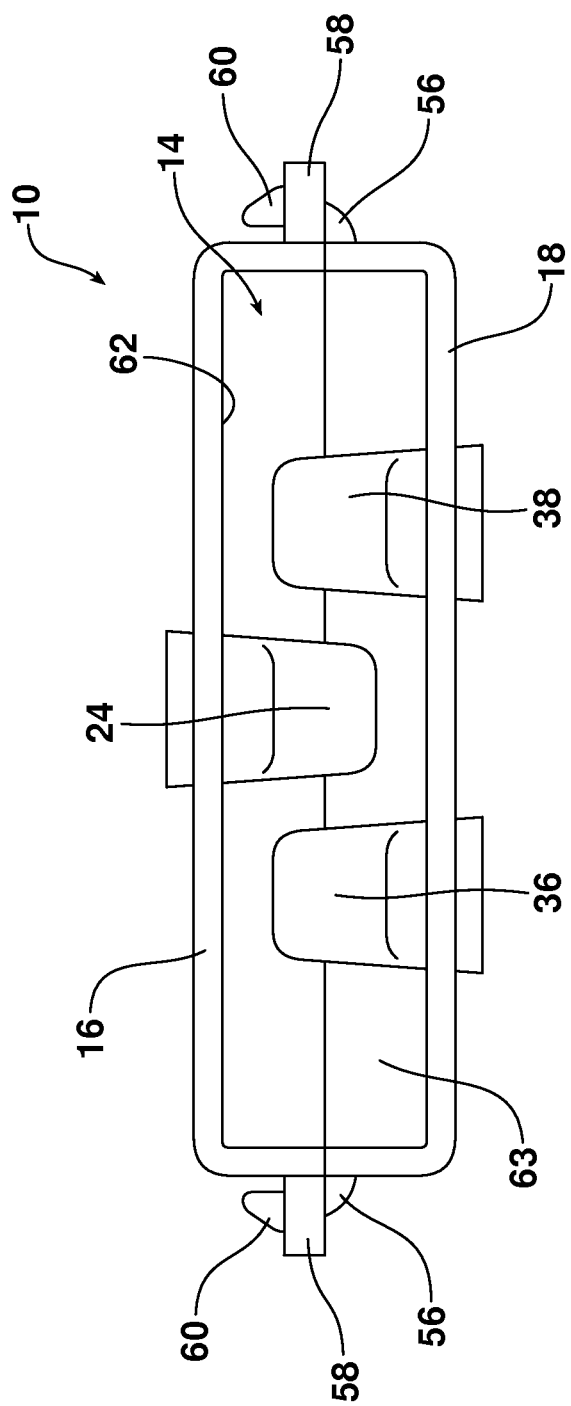
FIG. 3 is a top plan view of the closed body illustrating the opening in communication with the cavity that receives the electronic device and further showing how the integral retention elements project into that cavity to hold the electronic device in a desired position within the cavity.

As should be appreciated from viewing drawing FIGS. 1-3, the second section 18 includes a second opening 32 and a third opening 34. A second integral retention element 36 is carried in the second opening 32 and a third integral retention element 38 is carried in the third opening 34.

The second integral retention element 36 includes a second beveled front face 40 and a second groove 42 at the rear side thereof, while the third integral retention element 38 includes a third beveled front face 44 and a third groove 46 at the rear side thereof.

As should be further appreciated, the second integral retention element 36 is connected to a margin of the second opening by a second living hinge 48 at a proximal end thereof, opposite the free distal end 50. Similarly, the third integral retention element 38 is connected to a margin of the third opening 34 by a third living hinge 52 opposite the free distal end 54. Thus it should be appreciated that the second integral retention element 36 pivots or rotates about the second living hinge 48 with respect to the second section 18 and the third integral retention element 30 pivots or rotates about the third living hinge 52 with respect to the second section 18. In the illustrated embodiment, the first retention element 24 is opposed and offset from the second and third retention elements 36 and 38 so as to provide a superior geometry for gripping and holding an electronic device.

As best illustrated in FIG. 2, the apparatus 10 also includes a snap tab feature for securing the first and second sections 16,18 together. More specifically, the snap tab feature comprises a plurality of resilient tabs 56 and a plurality of cooperating latching lugs 58. In the illustrated embodiment, the resilient tabs 56 are provided on the second section 18 while the latching lugs 58 are provided on the first section 16. As illustrated in FIG. 2, the body 12 is closed by pivoting the first and second sections 16,18 together (note action arrows A) about the flexible hinge 20 and engaging the resilient tabs 56 in the cooperating latching lugs 58. A locking rib 60 provided on each tab 56 engages with the associated latching lugs 58 to complete the connection so that the sections of the body 12 form the cavity 14. As best illustrated in FIG. 3, that cavity has an opened end 62 and an opposite closed end 63.

As should be appreciated, the body 12, including the first section 16 and second section 18 as well as the integral retention elements 24, 36 and 38 may be of unitary construction and molded from a single piece of plastic or composite material. This includes the hinges 20, 30, 40 and 52 as well as the resilient tabs 56 and the latching lugs 58. This reduces the number of parts, streamlines production and minimizes manufacturing costs.

Figure 4:
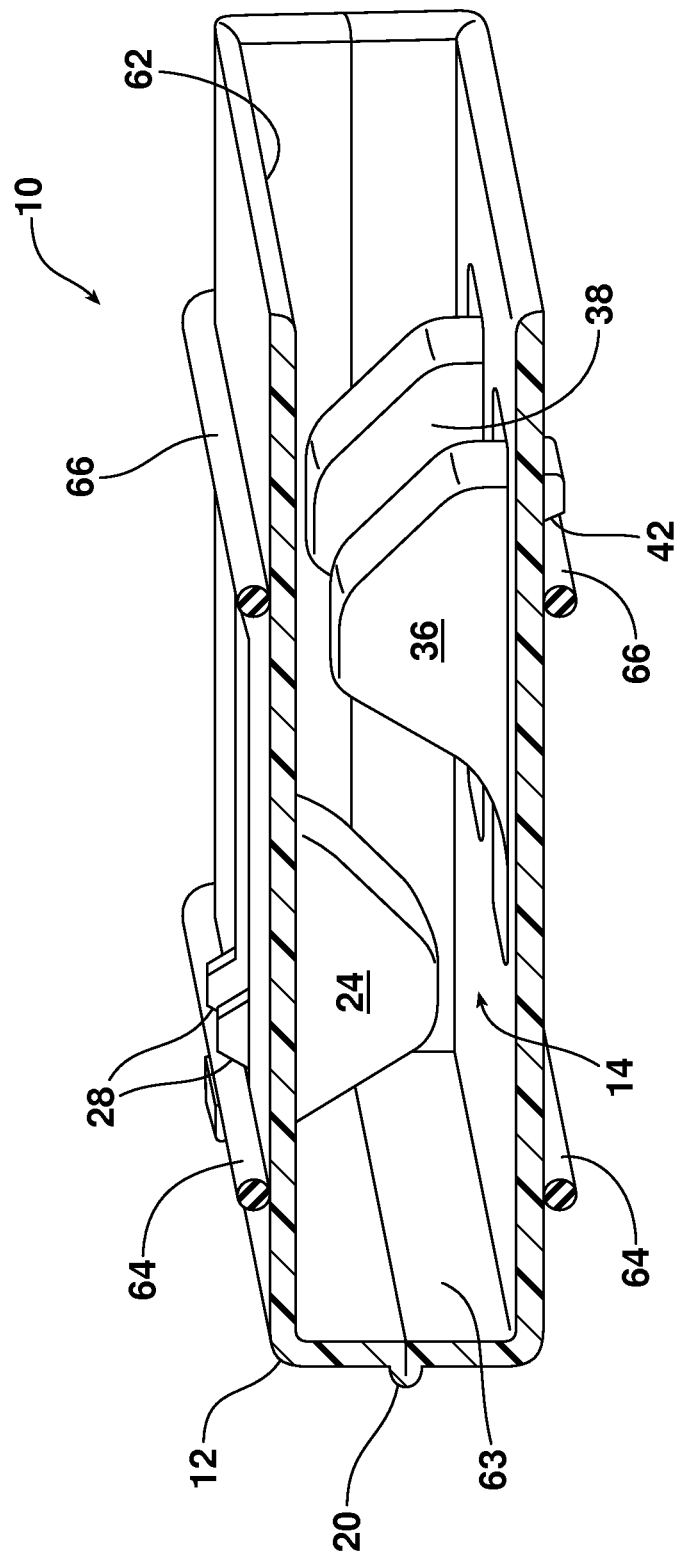
FIG. 4 is a perspective cross-sectional view further illustrating the elastic bands that are received around the body and function to bias the integral retention elements into engagement with the electronic device held in the cavity.

Reference is now made to FIG. 4. As illustrated in this drawing figure, a first elastic band 64 is expanded and extended around the body 12 across the rear side of the first integral retention element 24 so as to rest in the groove or channel 28 on the rear side thereof. This elastic band 64 functions to bias the first integral retention element 24 into the home position illustrated in FIG. 4. A second, similar elastic band 66 is expanded and extended around the body 12 so as to pass through the grooves or channels 42 and 46 at the rear sides of the second and third integral retention elements 36, 38. This second elastic band 66 functions to bias the second and third retention elements 36, 38 into the home position also illustrated in FIG. 4. As should be appreciated, the grooves 28, 42 and 46 make sure that the elastic bands 64, 66 are always in proper alignment for consistent control of the retention elements 24, 36 and 38.

Figure 5A:
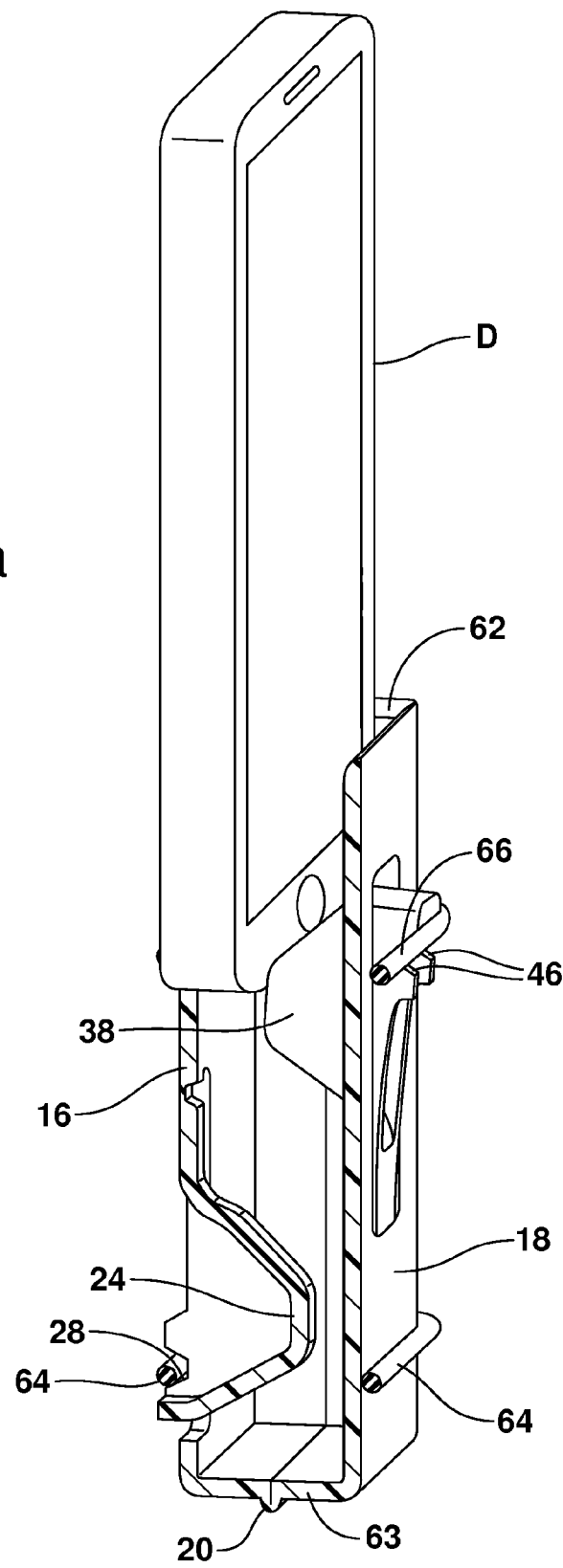
FIGS. 5a and 5b are cross-sectional views illustrating how an electronic device such as a smartphone may be received and held in the apparatus. More specifically.
Figure 5B:
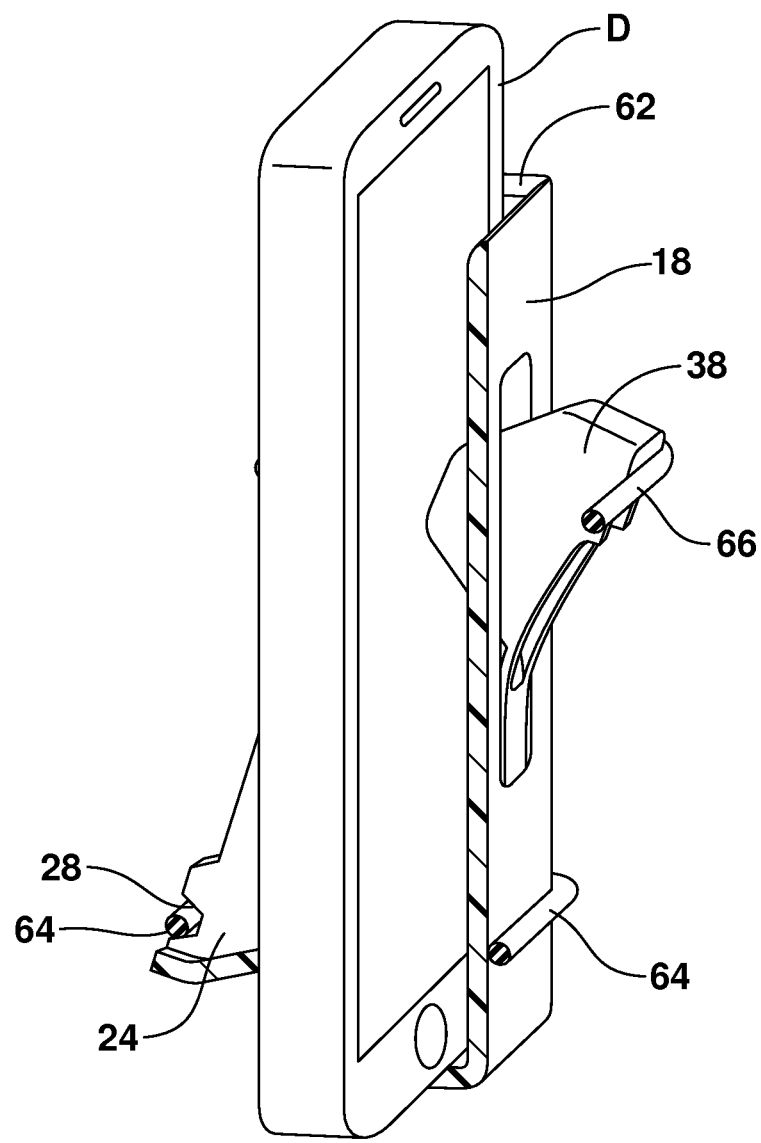

Reference is now made to FIGS. 5a and 5b. FIG. 5a illustrates the insertion of an electronic device, such as the smartphone D into the cavity 14 through the open end 60. As the device D is inserted into the cavity 14 in the direction of action arrow B, the lowermost end E of the device D engages the beveled faces 40, 44 of the second and third retention elements 36, 38 causing them to pivot about the living hinges 48, 52 in the direction of action arrow C against the biasing force of the second elastic band 66.

As illustrated in FIG. 5b, when the device D is fully inserted into the cavity 14, the lowermost end E of the device D has also contacted the beveled face 26 of the first integral retention element 24 which pivots about the living hinge 30 in the direction of action arrow D against the biasing force of the first elastic band 64. Thus, it should be appreciated that when fully seated in the cavity 14 of the apparatus 10, the device D is firmly held between the first integral retention element 24 which is opposed to the second and third retention elements 36, 38 due to the inward biasing force provided by the two elastic bands 64, 66 on those retention elements. Thus, as should be appreciated, the retention elements 24, 36 and 38 provide a constant force effective to retain and stabilize the electronic device D in substantially any desired position within the cavity 14, whether partially or fully inserted, depending upon the preference of the user. Further, it should be appreciated that the opposed retention elements 24, 36 and 38 will also accommodate a variety of phone sizes.

As should also be appreciated, the apparatus 10 may be mounted at any desired location in a motor vehicle via attachment to substantially any desired surface panel via various fastening designs such as clips, screws, sonic vibration welding or in any other appropriate manner. Accordingly, the apparatus 10 allows one to hold a smartphone, tablet or other electronic device in substantially any desired location within a motor vehicle where that device may be conveniently accessed and utilized as desired.

Figure 6:
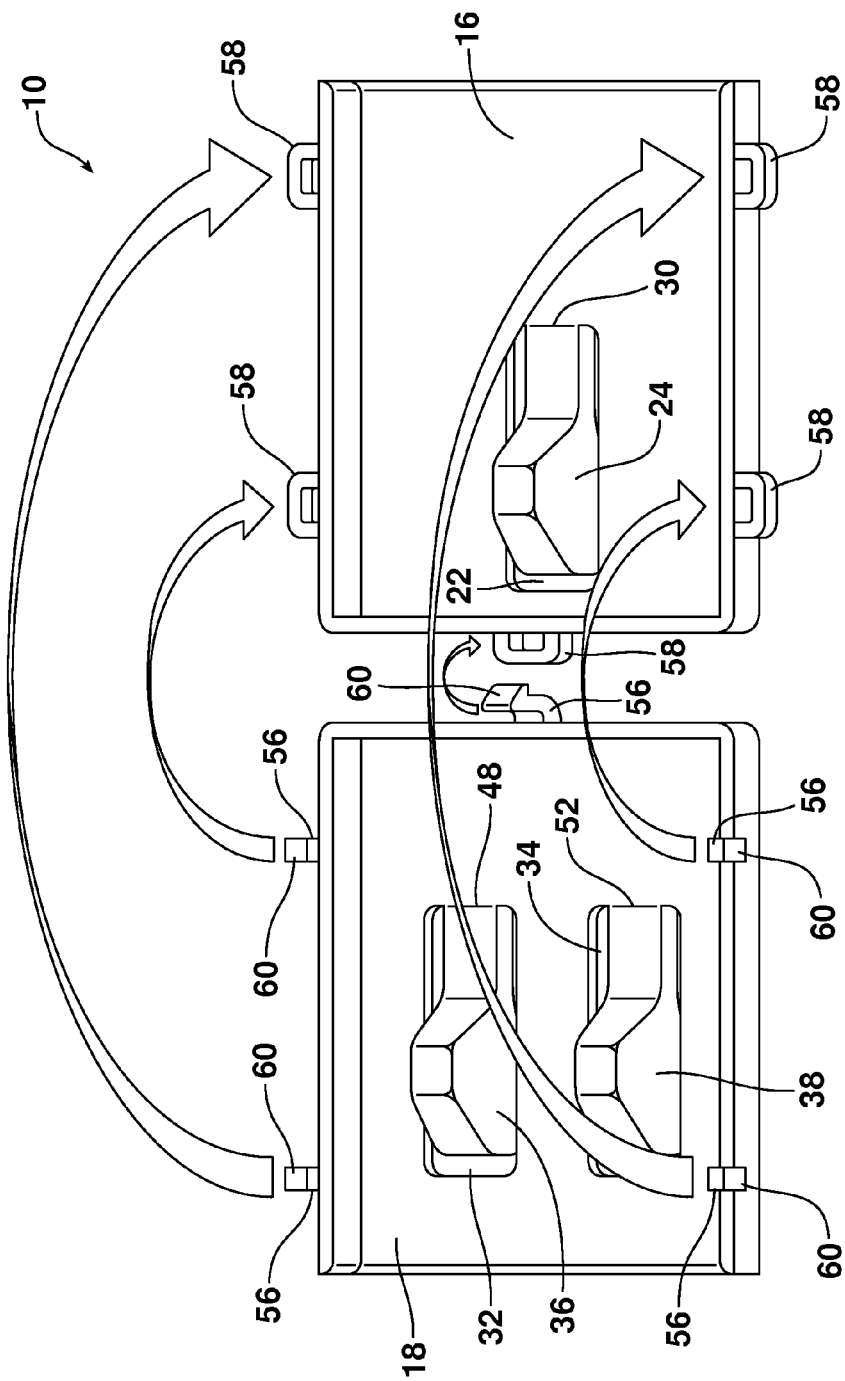

The foregoing has been presented for purposes of illustration and description. It is not intended to be exhaustive or to limit the embodiments to the precise form disclosed. Obvious modifications and variations are possible in light of the above teachings. For example, reference is now made to FIGS. 6 and 7 illustrating an alternative embodiment of the apparatus 10 wherein the first and second sections 16, 18 of the body 12 are completely separate instead of being connected together by flexible hinge 20 as illustrated in the first embodiment illustrated in FIGS. 1-5b. The separate first and second sections 16, 18 may be connected together by any appropriate means such as the illustrated retention features 56, 58, 60 in order to form the apparatus including the cavity for receiving an electronic device. The retention features 56, 58, 60 may be secured by sonic, IR or vibration welding/heat staking. In yet another alternative embodiment, fasteners such as screws may be used to secure the two sections 16, 18 together. Orientation/position of the retention features living hinge detail shown in 31, 48, 52, may be in different locations such as at the top edge of the retention elements 24. Design may include only (1) retention element, item 24, with/without an elastic band, item 64. In other words, retention element 24 and associated living hinge 31, 48, 52 may be molded from a resilient material providing sufficient force for gripping the electronic device D. All such modifications and variations are within the scope of the appended claims when interpreted in accordance with the breadth to which they are fairly, legally and equitably entitled.

What is claimed:

1. An apparatus for holding an electronic device, comprising:
    a body including a cavity for receiving the electronic device, said body including an integral retention element that engages the electronic device in said cavity; and
    a first elastic band extending around said body and across a rear side of said integral retention element.

2. The apparatus of claim 1, wherein said body includes a first section and a separate second section that are connected together to form said cavity.

3. The apparatus of claim 1, wherein said integral retention element has a proximal end, formed by a living hinge, and a free distal end.

4. The apparatus of claim 3, wherein said body further includes a first section having a first opening and said integral retention element is provided in said opening.

5. The apparatus of claim 4, further including a second integral retention element having a second proximal end, formed by a second living hinge, and a second free distal end.

6. The apparatus of claim 5, further including a third integral retention element having a third proximal end, formed by a third living hinge, and a third free distal end.

7. The apparatus of claim 6, wherein said body includes a second opening and a third opening, said second integral retention element being received in said second opening and said third integral retention element being received in said third opening.

8. The apparatus of claim 7, wherein said second opening and said third opening are provided in a second section of said body opposite said first section.

9. The apparatus of claim 8, wherein said first section and said second section of said body are connected together by a flexible hinge.

10. The apparatus of claim 8, including a first elastic band extending around said body and across a rear side of said integral retention element.

11. The apparatus of claim 10, wherein said integral retention element includes a beveled face and at least one groove receiving and holding said first elastic band.

12. The apparatus of claim 11, including a second elastic band extending around said body and across rear sides of said second integral retention element and said third integral retention element.

13. The apparatus of claim 12, wherein said second integral retention element includes a second beveled face and at least one second groove receiving and holding said second elastic band and said third integral retention element includes a third beveled face and at least one third groove receiving and holding said second elastic band.

14. The apparatus of claim 13, further including a snap tab feature securing said first section to said second section so as to form said cavity.

15. The apparatus of claim 14, wherein said snap tab feature comprises a plurality of resilient tabs and a plurality of cooperating latching lugs.

16. The apparatus of claim 15, wherein said body, including said integral retention element, said second integral retention element and said third integral retention element, is of unitary construction molded from a single piece of plastic material.

17. An apparatus for holding an electronic device, comprising:
    a body including a cavity for receiving the electronic device, said body including opposed and offset retention elements extending into said cavity and engaging said electronic device in said cavity; and
    at least one elastic band extending around said body and across said opposed and offset retention elements to bias said opposed and offset retention elements against said electronic device.

* * * * *